United States Patent [19]

Schumacher

[11] 3,750,628

[45] Aug. 7, 1973

[54] WATERING VALVE FOR SMALL ANIMALS, ESPECIALLY CHICKENS, PREFERABLY WITH DRIP PAN

[76] Inventor: Egon Schumacher, Rechternesstr. 18, 12847 Barnstorf, Germany

[22] Filed: Aug. 20, 1971

[21] Appl. No.: 173,611

[30] Foreign Application Priority Data
Aug. 20, 1970 Germany .................. G 70 31 233.3
Aug. 20, 1970 Germany .................. G 70 31 234.4

[52] U.S. Cl. ............................. 119/72.5, 137/614.18
[51] Int. Cl. ............................................. A01k 7/00
[58] Field of Search .................................... 119/72.5; 137/614.18; 251/339, 368

[56] References Cited
UNITED STATES PATENTS

| | | | |
|---|---|---|---|
| 2,475,739 | 7/1949 | Frank | 119/72.5 X |
| 2,851,007 | 9/1958 | Kagan | 119/72.5 X |
| 304,610 | 9/1884 | Cabell | 137/614.14 |
| 3,477,471 | 11/1969 | Mallinson | 137/614.18 |
| 3,527,193 | 9/1970 | Smith | 119/72.5 |
| 3,590,781 | 7/1971 | Spencer | 119/72.5 |

*Primary Examiner*—Aldrich F. Medbery
*Attorney*—Richard C. Sughrue, Robert J. Seas, Jr. et al.

[57] ABSTRACT

A watering valve and trough for chickens. The valve has a body housing two axially aligned conical valves, the upper one having a plastic seat and the lower one having a metal seat. The valve body is inserted into a water line from the underside and a cup like trough is attached to the protruding body. An actuating lever is pivoted in the trough and opens both valves when struck by a chicken's beak.

6 Claims, 5 Drawing Figures

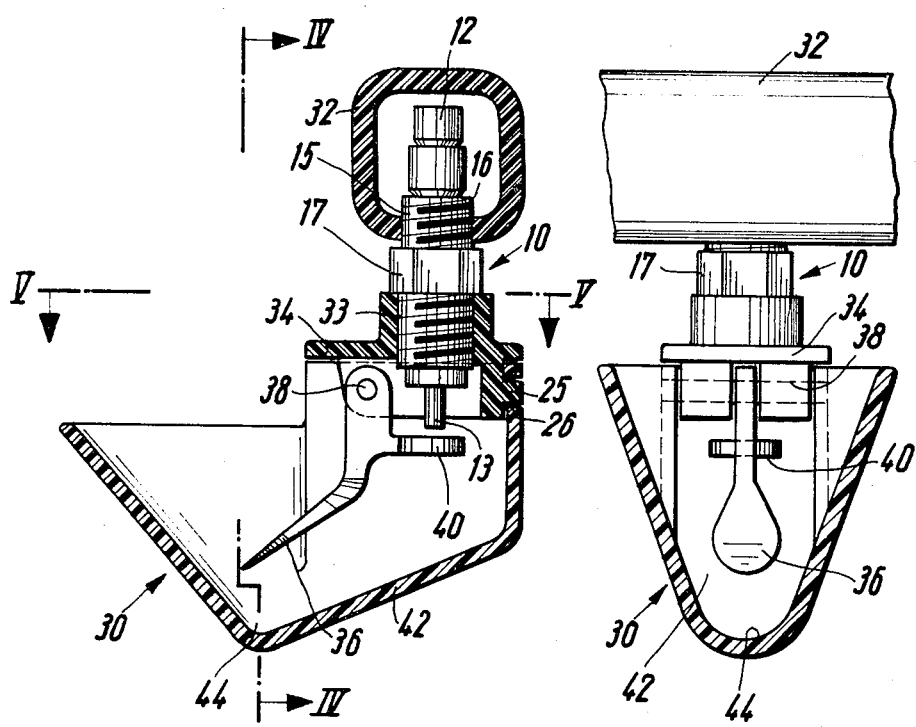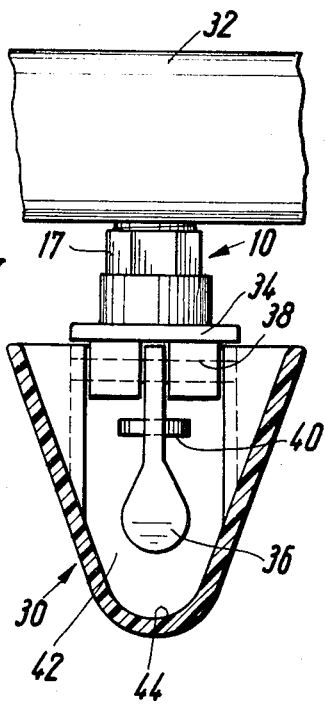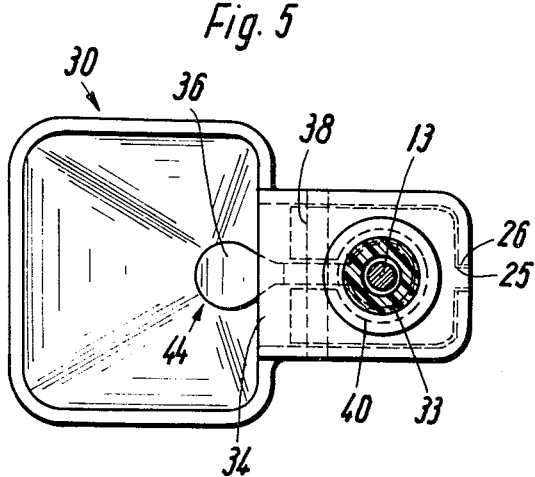

WATERING VALVE FOR SMALL ANIMALS, ESPECIALLY CHICKENS, PREFERABLY WITH DRIP PAN

The invention relates to a watering valve for small animals, especially chickens, having a valve housing which is inserted in a water line, which is partly made of plastic, and in which there are movably arranged a valve pin with a valve cone, as well as a head cap with a locking cone, and also including a drop pan for the water.

Such watering valves are used in connection with chicken keeping. The valve housing is inserted into a drilled hole in a water line in such a manner that the shaft of the valve pin, which protrudes below the valve housing can be activated by the small animal. In other words, it can be raised either directly or by means of an actuating lever which is placed in a drop pan arranged under the valve.

The invention deals both with the watering valve, individually and with a watering valve combined with a drip pan.

The valve according to this invention is characterized by a valve seat arranged for the valve cone of the valve pin in a known manner at a housing part made of metal, especially steel, and a further valve seat is arranged for te locking cone of the head cap in a plastic housing part.

The invention recognizes that a valve seat, made of metal, is sufficient for the actual valve cone arranged on the valve pin in order to close the valve tightly and to take care of the wear and tear stresses in the valve. For the long-term, unrestricted operation of the watering valve, it is, on the other hand, desirable to have a plastic valve seat for the valve cone on the head cap. The valve cone of the head cap has the function of preventing the entry of contamination into the valve.

In a watering valve, combined with a drip pan, the invention provides the watering valve on the underside of the water line, and the drip pan lies below the watering valve. As a result, when the watering valve is open, the water runs from the top through the valve into the drip pan. This makes it easier to take out water. In the drawings:

FIG. 3 shows a watering valve with drip pan in the mounted state;

FIG. 4 shows a cross-section along IV—IV with respect to FIG. 3; and

FIG. 5 shows a cross-section along V—V with respect to FIG. 3.

Figure 1:
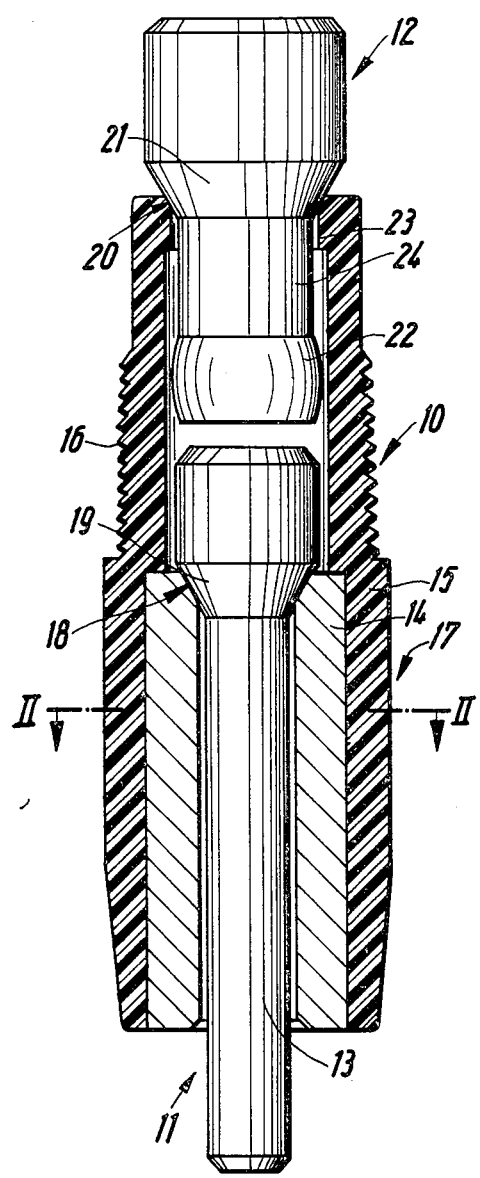
FIG. 1 shows a watering valve according to the invention in a vertical longitudinal cross-section.
Figure 2:
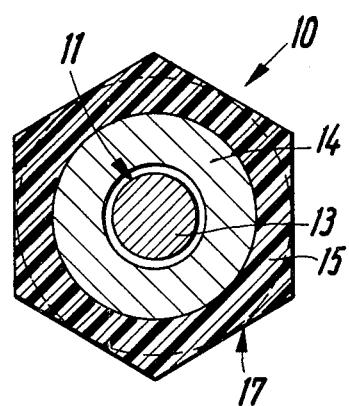
FIG. 2 shows a lateral cross-section along line II—II in FIG. 1.

The watering valve according to the invention consists of a valve housing 10 in which a valve pin 11 and a head cap 12 are axially movable. Valve housing 10 is inserted into a water line in such a manner that the lower end of the valve pin 11, including the shaft 13, protrudes below the line to provide an actuator end for moving the valve pin.

The valve housing 10 consists of two parts, an internal, roughly cylindrical metal housing 14 and an external plastic housing 15. The metal housing 14 is inserted into the plastic housing 15 along its entire length. The plastic housing is provided on the outside with a threaded part 16 for screwing into the wall of a water line, as well as with a hexagonal section 17 for engagement with a wrench.

The cylindrical metal housing 154 is provided at its upper end with a valve seat 18 for a valve cone 19 on valve pin 11. Another valve seat 20, for a locking cone 21 on the head cap 12, iss arranged on the upper end of the plastic housing 15, so that a plastic valve seat 20 is provided for this locking cone 21. The head cap 12 protrudes with a widened end out of the plastic housing 15. The other end of the head cap 12 is inserted into the upper end of valve housing 15 with a bandlike widening 22. The maximum ouside diameter of the widening 22 is greater than the inside diameter of the upper end of the plastic housing 15 in the area of an inner band 23. As a result of the elasticity of the plastic, the head cap 12 may be pressed through the opening in the area of band 23. After assembly the head cap sits with its widening in plastic housing 15 in such a manner that it can be moved in noraml operation without comint out, yet can be forcibly removed for repair. The diameter of the opening in the area of band 23 is somewhat greater than the diameter of a shaft 24 of the head cap so that, when the locking cone 21 is lifted up, water can enter the valve housing.

The watering device illustrated here according to the invention consists of a watering valve 10 and a drip pan 30 which is connected with the valve. The water valve 10 consists of a valve housing 15 made of plastic with metal inserts for the formation of tight valve seats. In valve housing 15, a valve shaft 13 is guided movably and acts as locking member. This shaft is equipped with a closing cone (not shown). Furthermore, a head cap 12 can be moved in valve housing 15. The underside of the head cap rests against the topside of the valve shaft 13 when the watering valve 10 is open. The head cap 12 is lifted along with the valve shaft 13 when the watering valve 10 is opened so that a second valve seat, which can be closed off by head cap 12 is releasd.

Watering valve 10, in the example illustrated, is inserted in the underside of a water line 32. Below the hexagonal area 17 there is another threaded area 33 for connecting the drip pan 30 to valve 10 via a cup member 34. The connection of the watering valve 10 with the water line 32 as well as the cup member 34 can also be accomplished in another fashion, preferably in a form-locking manner.

In the drip pan 30 an activation lever 36 is swingably positioned on a lateral shaft 38. Activation lever 36 is provided with a projection 40 which, when the lever is swung counterclockwise (FIG. 3), comes to rest against the underside of valve shaft 13 and lifts the latter. Activation lever 36 is swung around by means of the beak of the small animal which is stuck into the drip pan 30. The lever returns into its initial starting position by means of its own weight.

Drip pan 30 is designed in a special manner. The floor walls 42 of the drip pan are inclined in such a manner that a pointed, sump-like depression 44 is formed in the bottom of the pan. In the example illustrated, the drip pan is designed roughly like an oblique, inverted pyramid. This has the advantage that the water is collected in a concentrated position in the drip pan and can thus be taken out more easily. Besides, any possible contamination in the water due to fodder remnants along the beaks of the small animals will be collected in the area of depression 4.

The operating end of the activating lever 36 is so arranged with regard to the depression 44 that, in case of activation of the lever, the beak of the small animal is guided into the depression. In other words, water is always and exclusively removed in the area of the depression, whereby ecessarily any possible contamination, such as fodder remnants from the beaks of the small animals, in the water will again be picked up by the small animal. When the watering valve 10 is in the open position, activating lever 36 is pressed almost against the floor wall 42 of the drip pan 30 so that water, flowing in though the watering valve 10 will wash over the activating lever and thus keep it clean.

drip pan 30 is connected with valve housing 15 via cup member 34 which like the drip pan itself, is made of plastic. The connection between the cup member and the drip pan is provided primarily through the shaft 38 of the activtion lever 36. The ends of shaft 38 are laterally run both through a down-drawn wall of the cup member 34 and through the wall of the drip pan 30 which at this place is accordingly drawn up. On the side opposite the shaft 38, the drip pan and cup member are additionally connected with each other by a lip 25 of the cup member which enters a hole 26 in the drip pan. This connection between the cup member and the drip pan is easily established and, if necessary, can easily be removed for any necessary cleaning or repair work. The parts used here, that is the cup member and the drip pan, are easily producible injection-molded parts. Furthermore, the invention facilitates the subsequent installation of the drip pan because the latter can be placed on existing watering valves 10 by means of the cup member 34.

What is claimed is:

1. A water valve for small animals, such as chickens, adapted to be inserted into a water suply pipe line comprising:

a plastic valve housing having a central bore formed therethrough, an inner band formed on one end of said housing around said central bore, said inner band forming an opening having a diameter less than the diameter of said central bore;

a cylindrical metal housing having a longitudinal bore formed therethrough positioned within said central bore of said valve housing at the end opposite said inner band, the end of said metal housing extending into the central bore of said valve housing having a valve seat formed thereon;

a valve pin movably positioned within said central bore in said valve housing, said valve pin having a diameter greater than the diameter of said bore formed through said cylindrical metal housing and less than the diameter of said central bore formed in said valve housing and including a longitudinal shaft extending through said bore in said metal housing, a valve cone formed on said valve pin between said large diameter portion and said shaft, said valve cone adapted for cooperation with the valve seat formed on said metal housing; and a head cap movably positioned within the opening formed by said inner band on said one end of said housing, said head cap including a shaft having a diameter less than the diameter of the opening through said inner band, said shaft having an enlarged diameter end portion formed on the end extending into said central bore in said valve housing, said enlarged diameter portion having a diameter grater than the opening through said inner band and less than the dameter of said central bore, the end of said shaft extending outwardly from said central bore having a tapered locking cone formed thereon and adapted to engage a valve seat formed on the end of said valve housing.

2. A water valve as in claim 1, where the outer surface of the valve body is threaded.

3. A water valve as in claim 1 where the valve stem and actuator are metal.

4. A water valve as in claim 1, further including a trough member and a lever member, the trough member positioned below the water valve and adapted to receive the water fom the valve and the lever member positioned on the trough member in contacting relation to the actuator.

5. A water valve as in claim 4, where the lever member is pivotably connected to the trough member and has both ends positioned in the trough member.

6. A water valve as in claim 5, where the trough member has an inverted oblique pyramid shape with the end of the lever member positioned adjacent the bottom and adapted to be actuated by the impact of the pecking action of a chicken's beak.

* * * * *